(12) United States Patent
Kiveisha et al.

(10) Patent No.: US 8,989,670 B2
(45) Date of Patent: Mar. 24, 2015

(54) LOCATION AWARE FILE SHARING BETWEEN NEAR FIELD COMMUNICATION ENABLED DEVICES

(71) Applicant: Intel Corporation, Santa Clara, CA (US)

(72) Inventors: Yevgeniy Kiveisha, Bney Aish (IL); Aviv Ron, Nir Moshe (IL); Tomer Rider, Naahryia (IL); Yair Giwnewer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 13/625,152

(22) Filed: Sep. 24, 2012

(65) Prior Publication Data

US 2014/0087654 A1    Mar. 27, 2014

(51) Int. Cl.
*H04B 7/00*    (2006.01)
*H04B 5/00*    (2006.01)

(52) U.S. Cl.
CPC .................................. *H04B 5/0031* (2013.01)
USPC .......................... 455/41.3; 455/41.2; 455/566

(58) Field of Classification Search
CPC .................... G06F 17/30126; H04M 2207/18; H04M 3/42348; H04N 1/00204; H04N 1/00424; H04N 2201/0055; H04N 2201/0096; H04W 4/02; H04W 76/023; H04W 84/18; H04W 8/005
USPC ........................................ 455/41.2, 41.3, 566
See application file for complete search history.

(56) References Cited

U.S. PATENT DOCUMENTS

| | | | |
|---|---|---|---|
| 8,077,335 B2 * | 12/2011 | Ookuma | 358/1.15 |
| 2009/0103124 A1 * | 4/2009 | Kimura et al. | 358/1.15 |
| 2010/0120450 A1 * | 5/2010 | Herz | 455/456.3 |
| 2011/0193788 A1 * | 8/2011 | King et al. | 345/173 |
| 2011/0321118 A1 | 12/2011 | Boldyrev et al. | |
| 2012/0147268 A1 | 6/2012 | Hassan et al. | |
| 2012/0196586 A1 | 8/2012 | Grigg et al. | |

FOREIGN PATENT DOCUMENTS

| | | |
|---|---|---|
| KR | 10-2011-0067722 A | 6/2011 |
| WO | 2010/089458 A1 | 8/2010 |
| WO | 2012/121669 A1 | 9/2012 |

OTHER PUBLICATIONS

International Search Report and Written Opinion received for PCT Patent Application No. PCT/US2013/047412, mailed on Oct. 18, 2013, 13 pages.

* cited by examiner

*Primary Examiner* — Lewis West
(74) *Attorney, Agent, or Firm* — Sutherland Asbill & Brennan LLP

(57) ABSTRACT

Systems, methods, and computer-readable media are provided for connecting, selecting, and/or transferring data files among near field communication (NFC) enabled devices. An initial communication link may be established. A subsequent communication link may be established through an exchange of data communicated over the initial communication link. A data file may be provided facilitating a retrieval and rendering of a first device icon and a second device icon. The first device icon and the second device icon are utilized to transfer one or more selected files over the subsequent communication link.

20 Claims, 11 Drawing Sheets

US 8,989,670 B2

LOCATION AWARE FILE SHARING BETWEEN NEAR FIELD COMMUNICATION ENABLED DEVICES

FIELD OF THE DISCLOSURE

Aspects of the invention relate generally to connecting selecting, and/or transferring data files, and more particularly, doing so between near field communication (NFC) enabled devices.

BACKGROUND

File sharing utilizing near field communication (NFC) pairing is becoming more popular among mobile device users today. Because NFC technology is more widely adopted, more users are sharing data between mobile devices operated by the user and/or with mobile devices operated by another user. However, file sharing between mobile devices is often cumbersome and not user-friendly. For example, a file sharing application utilized to facilitate data sharing may require the user to take numerous steps through a menu-driven process, often times making it difficult for the user to transfer and/or share data files between mobile devices. Accordingly, finding improved ways to connect, select, and transfer data files between NFC pairings continues to be a priority.

BRIEF DESCRIPTION

Some or all of the above needs and/or problems may be addressed by certain embodiments of the invention. Embodiments of the invention may include systems methods, and computer-readable media for connecting and selecting an initial communication link to be established between a first device and a second device. A subsequent communication link may then be established between the two devices based at least in part on data exchanged over the initial communication link. A data file may be exchanged over the subsequent communication link, wherein the data file may facilitate a retrieval and/or rendering of a device icon on each of the first and second devices, wherein the icon on each device represents the other device. A user may utilize the device icon on his or her device to transfer one or more selected files between the first and second devices via the subsequent communication link.

In accordance with another embodiment, an NFC enabled device may be provided. The NFC enabled device may include at least one antenna, at least one communications interface, at least one processor, and at least one memory. The at least one processor may be configured to initiate a file sharing application when the device establishes an NFC communication link with another NFC enabled device. The communications interface may present an icon that represents the other device, and this icon may facilitate the sharing of a data file. The location of the antenna on the device may determine, at least in part, the location of the icon on the device.

In addition, when the device includes multiple NFC antennas, each antenna may be associated with a different file sharing feature. For example, one feature may be the sharing of photos, where another feature may be the sharing of music, a contact, a video, an audio client, a document, etc.

Additional systems, methods, computer-readable media, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
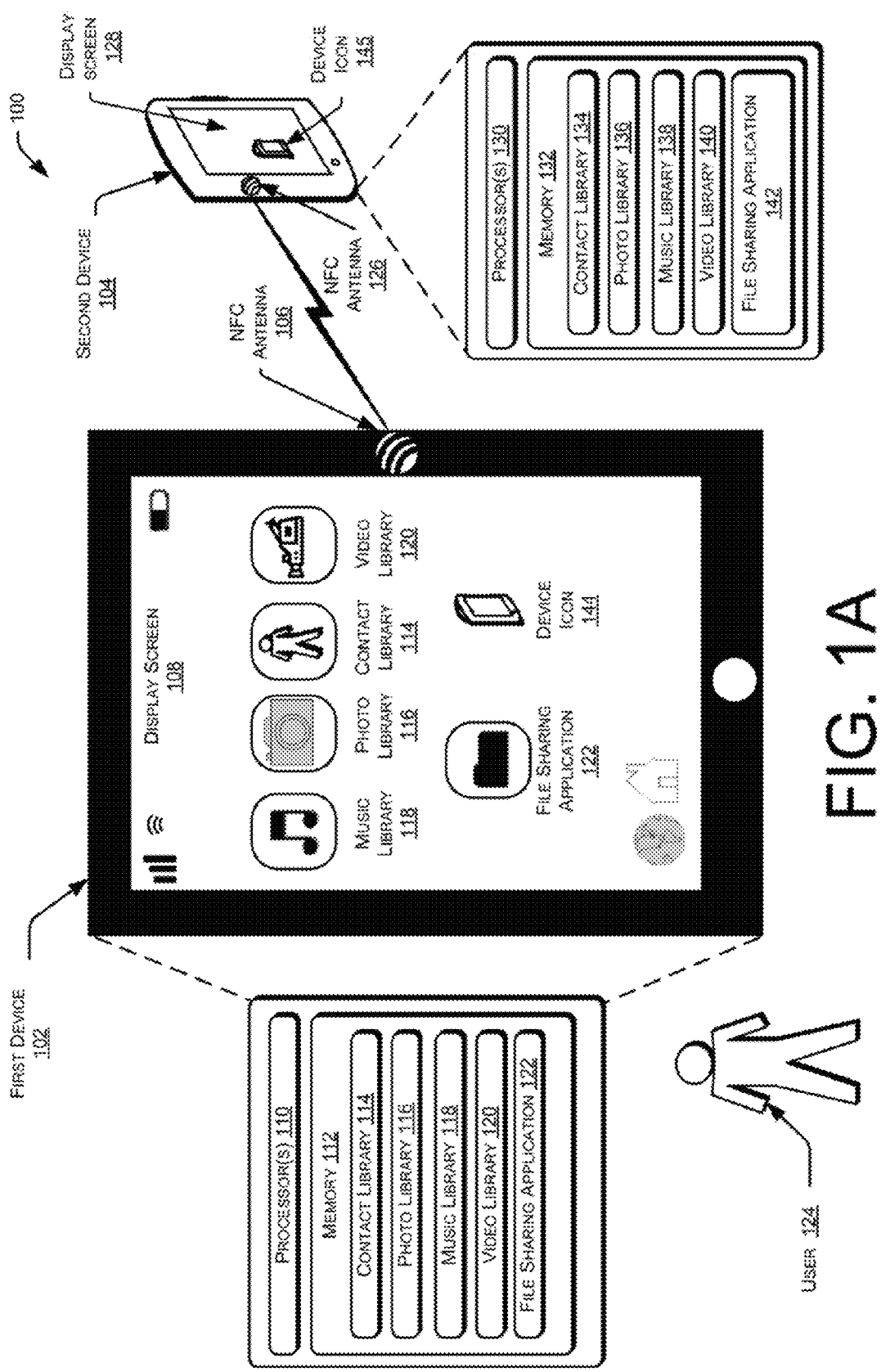
FIG. 1A illustrates a block diagram an example environment that may be utilized to connect, select, and/or transfer data files among near field communication (NFC) enabled devices, according to an illustrative embodiment of the disclosure.

As noted above, embodiments of the present disclosure are directed to, among other things, systems, methods and computer-readable media for connecting near field communication (NFC) enabled devices and sharing data files between the NFC enabled devices. As an overview, users may pair NFC enabled devices to establish a communication link over which the devices may share data and applications. In some examples, data may include photos, video, music, contacts, video games, other digital content, combinations of the foregoing, and any other suitable content that may be transferred between mobile devices.

In some instances, a first device and a second device may use an NFC connection to bootstrap a more capable wireless connection, such as a peer-to-peer connection via a Bluetooth or Wi-Fi Direct connection (also referred to herein as a communication link). The communication link may enable a user to share data files between the first and second devices. In one embodiment, an icon presented on a display of the first device representing the second device may be presented to the user on a display screen of the first device. The user may select data files on the first device and share the selected files with the second device using the presented icon, for example, utilizing a drag-and-drop action.

In another instance, a first device may have multiple NFC antennas, and each NFC antenna may be utilized to define a location of the second device icon presented on the display screen of the first device. For example, when the second device touches or taps the first device at an NFC antenna that is located on the right side of the first device to establish an initial NFC connection, the first device may place the device icon associated with the second device at or near a predetermined location on the display screen of the first device, such as on the right edge of the display screen.

Furthermore, when a device includes multiple NFC antennas, each NFC antenna may be associated with a different concurrent wireless connection. That is, each NFC antenna may be utilized to establish a different connection, and these connections may be with the same device or with different devices. For example, a first device may establish multiple connections with the same second device, or the first device may establish connections with the second device as well as a third device and a fourth device. In this example, the first device may have on its display screen device icons representing the second, third and fourth devices, each of which may be located on the display screen in a manner that mirrors the relative physical location of those devices to the first device. For example, if the user of the second device is on the right side of the user of the first device, the device icon for the second device may be located on the right side of the display screen of the first device, and so on. This allows a user of the device to connect with multiple devices (i.e., other users) at the same time to facilitate a social sharing environment. In addition, each of the antennas may be associated with a specific file sharing function. For example, when a connection is established through a first antenna, a video file sharing function may be enabled. On the other hand, when the connection is established through a second antenna, a music file sharing function may be enabled.

The following discussion begins with a section entitled "Illustrative Architecture," which describes a non-limiting, peer-to-peer environment in which NFC enabled devices may pair and share data files. The discussion then concludes with a section entitled "Illustrative Processes" and a brief conclusion.

This brief introduction, including section titles and corresponding summaries, is provided for the reader's convenience and is not intended to limit the scope of the claims, nor the following sections. Furthermore, the techniques described above and below may be implemented in a number of ways and in a number of contexts. Several example implementations and contexts are provided with reference to the following figures, as described below in more detail. However, the following implementations and contexts are but a few of many.

Embodiments of the invention now will be described more fully hereinafter with reference to the accompanying drawings, in which embodiments of the invention are shown. The foregoing ideas may, however, be embodied in many different forms and should not be construed as limited to the embodiments set forth herein, rather, these embodiments are provided so that this disclosure will be thorough and complete, and will fully convey the scope of the invention to those skilled in the art. Like numbers refer to like elements throughout.

Illustrative Architecture

FIG. 1A depicts an illustrative environment 100 in which techniques for connecting near field communication (NFC) enabled mobile devices and sharing data files between the NFC enabled devices may be implemented. In the environment 100, an exemplary first device 102 may establish an initial communication link or connection to a second device 104. In some instances, the initial communication link may be an NFC peer-to-peer connection. In one non-limiting example, the NFC peer-to-peer connection permits a short-range two-way communication between the first device 102 and the second device 104. The short-range two-way communication may be established when an NFC antenna on the first device is located within a near field of an NFC antenna on the second device. In some instances, the near field may be a distance of four centimeters or less. Alternatively, the distance may be any distance permitting the NFC connection to be established. Alternatively and/or additionally, the initial communication link may be established by touching (also referred to as a tapping or bumping) the first device 102 and the second device 104 together.

The initial communication link established between the first device 102 and the second device 104 may then bootstrap a subsequent, and possibly more capable, communication link between the devices. In one non-limiting example, the subsequent communication link may be established based on data exchanged over the initial NFC communication link. For example, the exchange of data enabling the establishment of the subsequent communication link may include, without limitation, an exchange of device addresses (e.g., a MAC address), an exchange of one or more security tokens, and/or an exchange of the type of wireless communications supported (e.g., if the first device supports Bluetooth, then communication of this information may be sent to the second such that the second device can confirm it supports Bluetooth communication). In some instances, the subsequent communication link may be, without limitation, a Bluetooth connection, a Bluetooth Low Energy (BLE) connection, a Wi-Fi Direct connection, or the like. Further still, it will be appreciated that while much of the discussion herein may focus on Bluetooth and Wi-Fi direct wireless connections, the systems, methods, and apparatuses disclosed herein may be applied to any suitable wireless connection between devices, whether direct or indirect, ad-hoc, etc., operated at any suitable frequency, wavelength, modulation technique, pre-established standard, or protocol.

With continued reference to FIG. 1A, the first device 102 may be any suitable wireless computing device capable of enabling the initial communication link with the second device 104. For example, the first device 102 may be any type of NFC enabled computing device including, but not limited to, a mobile phone, a smart phone, a personal digital assistant (PDA), a tablet personal computer, a laptop, a desktop computer, an automobile or other motor vehicle or personal transport device, a home appliance, a portable gaming device, a game console, or other similar electronic devices. In one illustrative configuration, the first device 102 comprises an NFC antenna 106, a display screen 108, one or more processor(s) 110, and a memory 112. The memory 112 may be configured to store applications and data such as, without limitation, a contact library 114, a photo library 116, a music library 118, a video library 120, a first file sharing application 122, and the like. The applications and data may be presented to a user 124 via one or more display icons on the display screen 108. For example, display icons representing the contact library 114, the photo library 106, the music library 118, the video library 120, and the first file sharing application 122 may be presented to the user on display screen 108 in a format such that user 124 may easily identify the data and/or application the user wants to access. The display screen 108 may employ a touch screen display, whereby the user 124 may manipulate data presented on the display screen 108 utilizing a direct touch by a finger or stylus. Alternatively and/or additionally, the user may utilize alternative input devices such as, without limitation, a keypad, a mouse input, voice recognition, a gesture based motion, or the like.

In some instances, the first file sharing application 122 may be downloaded from a third-party source and stored in the memory 112 of the first device 102. Alternatively, the first file sharing application 122 may be embedded in the operating system of the device 102. In one non-limiting example, the first file sharing application 122 may be triggered upon the establishment of the initial communication link, and may facilitate the transfer and/or sharing of data from one device to another device. In some instances, data that may be transferred and/or shared may include, without limitation, a photo file, a video file, a contact file, a music file, a contact or a contact list, calendar events, user preferences, documents, or any other suitable content and combination thereof.

With continued reference to FIG. 1A, the second device 104 may be any suitable wireless computing device capable of enabling the initial communication link with the first device 102. While FIG. 1A illustrates the second device 104 as a different type of device than the first device 102 (e.g., a tablet computer versus a smart phone), it is to be understood that the first device and the second device may be the same type of wireless computing device. For example, similar to the first device 102, the second device 104 may be any type of computing device including, but not limited to, a mobile phone, a smart phone, a personal digital assistant (PDA), a tablet personal computer, a laptop, a desktop computer, an automobile or other motor vehicle or personal transport device, a home appliance, a portable gaming device, a game console, or other similar electronic device. In one illustrative configuration, the second device 104 may include, without limitation, an NFC antenna 126, a display screen 128, one or more processor(s) 130, and a memory 132. The memory 132 of the second device 104 may be configured to store applications and data similar to that of the memory 112 of the first device 102. For example, without limitation, the memory 132 may include a contact library 134, a photo library 136, a music library 138, a video library 140, a second file sharing application 142, and the like. The applications and data may be presented to the user 124 via one or more display icons on the display screen 128 of the second device 104 in a format such that the user 124 may easily identify the data and/or application the user wants to access. Similar to the display screen 108 of the first device 102, the display screen 128 of the second device 104 may employ a touch screen display, whereby the user 124 may manipulate data presented on the display screen 128 utilizing a direct touch by a finger or stylus. Alternatively and/or additionally, the user may utilize alternative input devices such as, without limitation, a keypad, a mouse input, a voice recognition, a gesture based motion, or the like.

In some instances, the second file sharing application 142 may be the same as or substantially similar to the first file sharing application 122 stored on the first device 102. Alternatively, the second file sharing application 142 may be another file sharing application capable of supporting the communication links between the first device 102 and the second device 104 and the subsequent data exchange described herein.

With continued reference to FIG. 1A, a device icon 144 representative of the second device 104 may be rendered on the first device 102, and a device icon 145 representative of the first device 102 may be rendered on the second device 104. For example, without limitation, the second device 104 may be a smart phone and the device icon 144 may also be a smart phone of the same make and model as the second device 104. Alternatively, the device icon 144 may be a representation of a generic smart phone, a generic phone, or any suitable representation of the second device 104. In certain embodiments, the device icon 144 may include a logo or other graphical indicia. The device icon 144 may also include a name for the second device, such as "John's Phone," presented in combination with and/or as part of the device icon.

A data file including and/or facilitating the retrieval of the respective device icons may be provided by the file sharing applications of the respective devices. For example, the file sharing application 122 of the first device 102 may send the second device 104 a data file associated with the device icon 145, and the file sharing application 142 of the second device 104 may send the first device 102 a data file associated with the device icon 144. The data file may be exchanged between the first device 102 and the second device 104 over the initial communication link (e.g., via an NFC connection), and/or over the subsequent communication link (e.g., via a Bluetooth or Wi-Fi Direct connection). For example, an image representing the first device 102 may be communicated to the second device 104, and this image may be utilized in rendering the device icon 145 on the display screen 128. Alternatively, device identification information may be transmitted between the devices, and the device icon 144 and the device icon 145 may subsequently be retrieved from the memory 112 of the first device 102 and the memory 132 of the second device 104, respectively. Alternatively, using the device identification information, the device icon 144 and/or the device icon 145 may be retrieved from a third-party source, such as from a central repository accessible over a network connection, such as via the Internet.

In some instances, the data file exchanged between the devices may also include a user identification information. For example, the data file provided by the second device 104 may include data indicating that the second device is "John's Phone" and the device icon 144 may indicate this information. In one non-limiting example, the user identification may be presented on a display screen 108 to the user 124 as a label associated with the device icon 144. Alternatively, the user 124 may hover over the device icon 144 using an input device, such as a mouse or stylus, and the user identification may be presented on a display system 108 to the user 124.

Figure 1B:
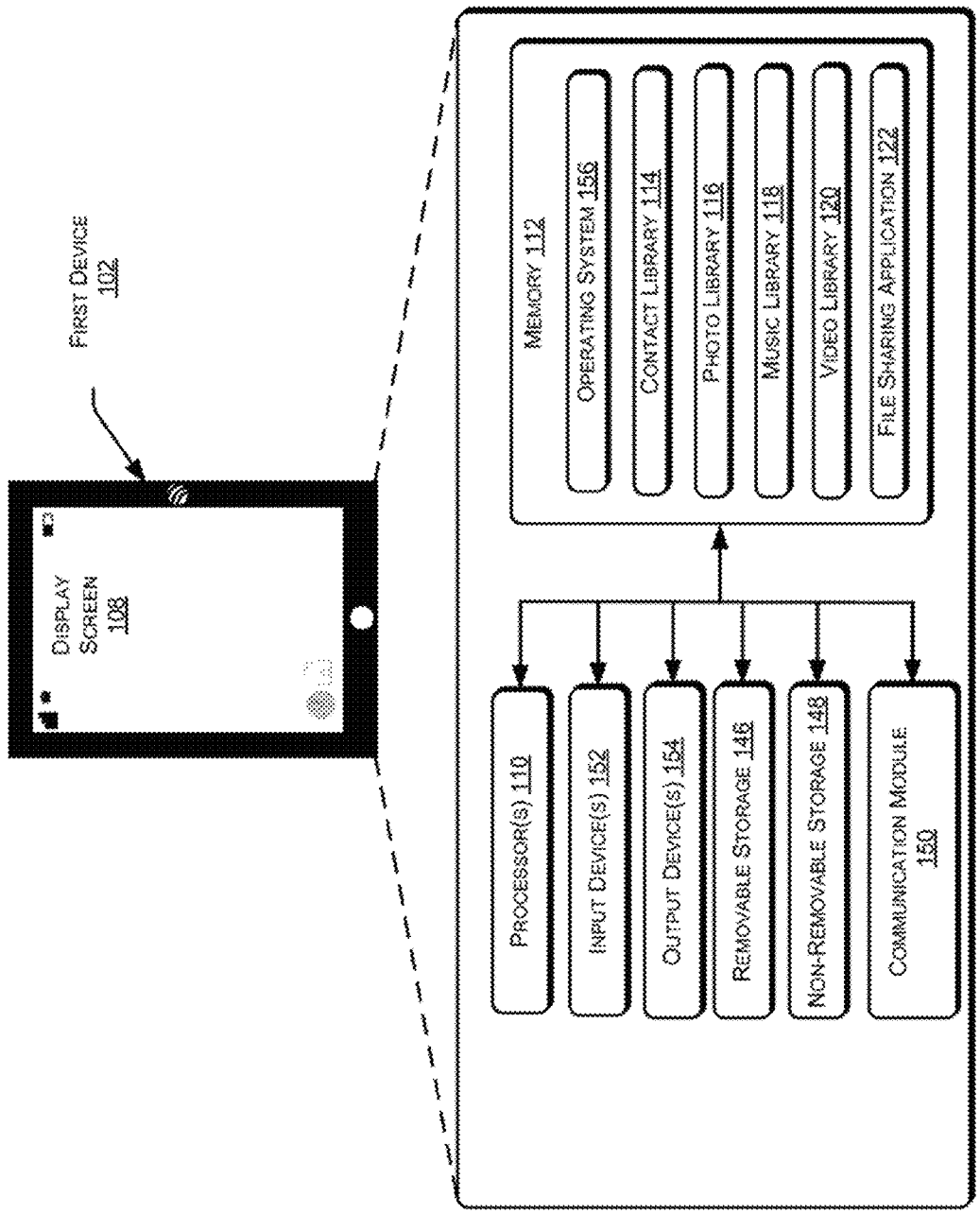
FIG. 1B further illustrates a block diagram an example NFC enabled device, according to the illustrative embodiment of FIG. 1A.

With reference to FIG. 1B, the first device 102 may be configured to communicate with the second device 104 and share and/or transfer data (e.g., a data file containing, in certain embodiments, content) between the devices. As noted above, the first device 102 comprises at least the memory 112 and one or more processor(s) 110. In one illustrative configuration, the one or more processor(s) 110 of the first device 102 may be implemented as appropriate hardware, software, firmware, or a combination thereof. Software or firmware implementations of the one or more processor(s) 110 may include computer-executable or machine-executable instructions written in any suitable programming language to perform the various functions described. Memory 112 may be further configured to store program instructions that are loadable and executable on the one or more processor(s) 110, as well as data generated during the execution of these programs. Depending on the configuration and type of first device 102, the memory 112 may be volatile (such as random access memory (RAM) and/or non-volatile (such as read-only memory (ROM), flash memory, etc.). The first device 102 may also include additional removable storage 146 and/or non-removable storage 148 including, but not limited to, magnetic storage, optical disks, and/or tape storage. The disk drives and associated computer-readable media may provide non-volatile storage of computer-readable instructions, data structures, program modules, and other data for the user devices. In some implementations, the memory 112 may include types of memory, such as static random access memory (SRAM), dynamic random access memory (DRAM), or ROM.

The memory 112, the removable storage 146, and the non-removable storage 148 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM) SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the first device 102 or other computing devices. Combinations of any of the above should also be included within the scope of computer-readable media.

Alternatively, computer-readable communication media may include computer-readable instructions program modules, or other data transmitted within a data signal, such as a carrier wave, or other transmission. However, as used herein, computer-readable storage media does not include computer-readable communication media.

The first device 102 may also include a communication module 150 that enables the first device 102 to communicate with a database, a server, a user terminal, and/or another device. For example, the communication module 150 may include the hardware and software, such as one or more transceivers, to broadcast and receive messages on wireless networks and/or in point-to-point communications, at any suitable frequency, using any suitable modulation technique, and/or communication standard or protocol. While the first device 102 may have an NFC antenna to facilitate NFC connections, it will be appreciated that the first device 102 may have multiple antennas as may be required to provide different types of connections, such as, but not limited to, Wi-Fi, Wi-Fi Direct, Bluetooth, Bluetooth low energy, cellular, third generation cellular (3G), fourth generation cellular (4G), long term evolution (LTE), Worldwide Interoperability for Microwave Access (WiMAX), etc., and combinations thereof. In certain embodiments, the devices 102, 104 may include multiple NFC antennas and the associated software and hardware required to pair with multiple devices.

The first device 102, as noted above, may include an input device 152 such as a keyboard, a mouse, a digital pen, a voice input device, a touch input device, etc. The first device 102 may further include an output device 154 such as a display, a speaker, a vibration device, a printer, etc.

Turning to the contents of the memory 112 of the first device 102 in more detail, the memory 112 may include an operating system 156 and one or more application programs or services for implementing the features disclosed herein including, without limitation, the contact library 114, the photo library 116, the music library 118, the video library 120, and the first file sharing application 122. While the first file sharing application 122 is illustrated in FIG. 1B as part, of the memory 112, as noted above, the first file sharing application may be part of the operating system 156.

While described in greater detail below, the file sharing application 122 may, in certain embodiments, retrieve and render the device icon 144 once the first device 102 is connected to the second device 104. As noted above, the device icon 144 may be received from the second device 104 or retrieved from local memory or remotely from a third party, such as a repository of device icons. Further, the file sharing application 122 may determine the file sharing function, if any, associated with the device icon 144, such as a music transfer, a photo transfer, a contact transfer, etc. The file sharing application 122 also may enable the sharing function both in a transmit mode as well as in a receive mode. Yet further, the file sharing application 122 may manage the communication links (i.e., connections) between the first device 102 and any other device with which file sharing is desired, such as the second device 104. The file sharing application 122 may provide many other functions, some of which are discussed herein.

Figure 1C:
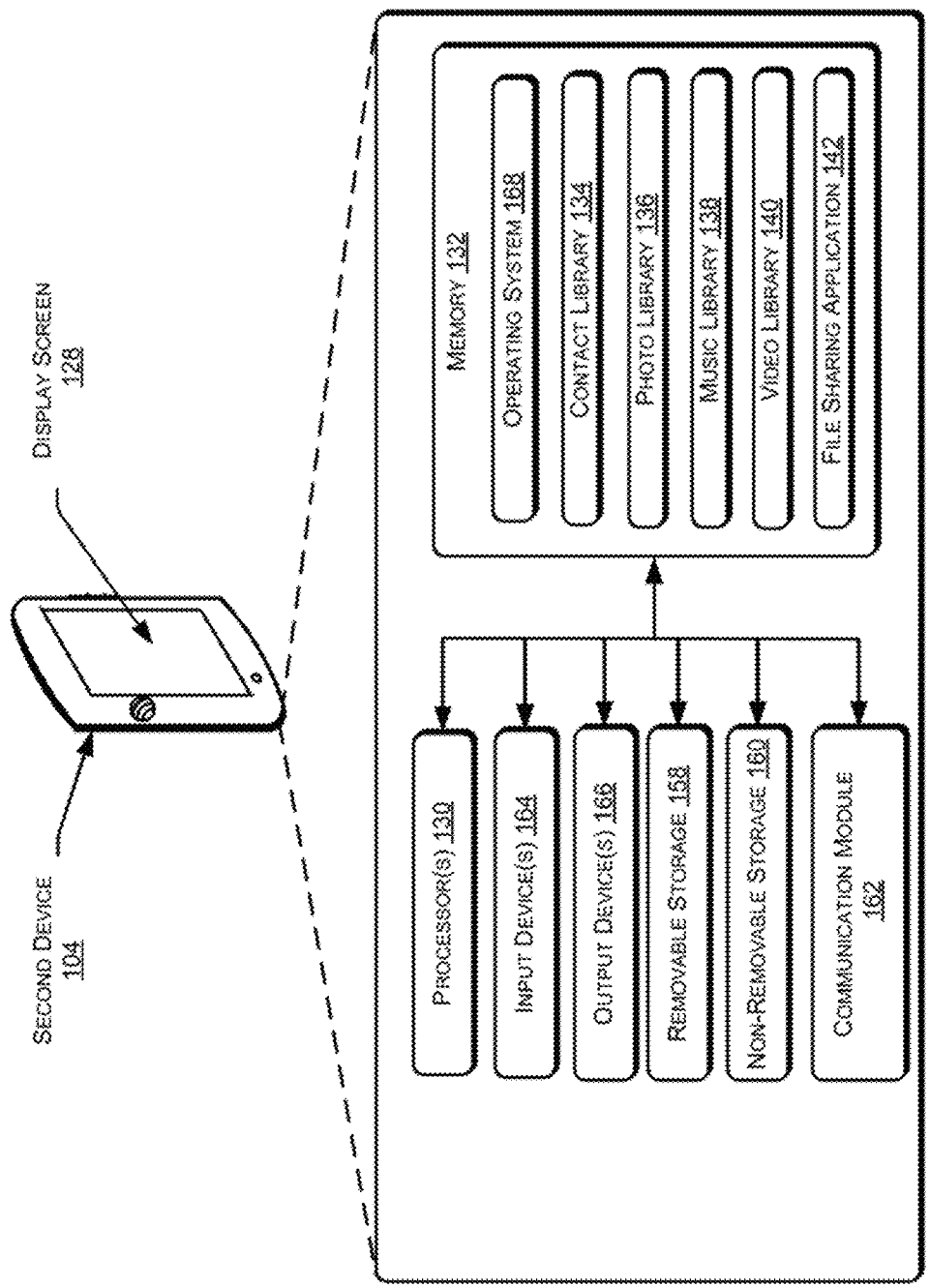
FIG. 1C further illustrates a block diagram another example NFC enabled device, according to the illustrative embodiment of FIG. 1A.

With reference to FIG. 1C, the second device 104 may be configured to communicate with the first device 102 and share and/or transfer data between the devices. In one non-limiting example, the second device 104 may comprise at least the memory 132 and the one or more processors 130. In one illustrative configuration, the one or more processor(s) 130 of the second device 104 may be implemented as appropriate hardware, software, firmware, or a combination thereof. Software or firmware implementations of the one or more processor(s) may include computer-executable or machine-executable instructions written in any suitable programming language to perform the various functions described. Memory 132 of the second device 104 may be further configured to store program instructions that are loadable and executable on the one or more processor(s) 130, as well as data generated during the execution of these programs. Depending on the configuration and type of second device 104, the memory 132 may be volatile (such as random access memory (RAM) and/or non-volatile (such as read-only memory (ROM), flash memory, etc.). The second device 104 may also include additional removable storage 158 and/or non-removable storage 160 including, but not limited to, magnetic storage, optical disks, and/or tape storage. The disk drives and associated computer-readable media may provide non-volatile storage of computer-readable instructions, data structures, program modules, and other data for the user devices. In some implementations, the memory 132 of the second device 104 may include types of memory, such as static random access memory (SRAM), dynamic random access memory (DRAM), or ROM.

The memory 132, the removable storage 158, and the non-removable storage 160 of the second device 104 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the second device 104 or other computing devices. Combinations of any of the above should also be included within the scope of computer-readable media.

Alternatively, computer-readable communication media may include computer-readable instructions program modules, or other data transmitted within a data signal, such as a carrier wave, or other transmission. However, as used herein, computer-readable storage media does not include computer-readable communication media.

The second device 104 may also include a communication module 162 that enables the second device 104 to communicate with a database, a server, a user terminal, and/or another device. For example, the communication module 162 may include the hardware and software, such as one or more transceivers, to broadcast and receive messages on wireless networks and and/or in point-to-point communications, at any suitable frequency, using any suitable modulation technique, and/or communication standard or protocol. While the second device 104 may have an NFC antenna to facilitate NFC connections, it will be appreciated that the second device 104 may have multiple antennas as may be required to provide different types of connections, such as, but not limited to, Wi-Fi, Wi-Fi Direct, Bluetooth, Bluetooth low energy, cellular, third generation cellular (3G), fourth generation cellular (4G), long term evolution (LTE), Worldwide Interoperability for Microwave Access (WiMAX), etc., and combinations thereof. In certain embodiments, the devices 102, 104 may include multiple NFC antennas and the associated software and hardware required to pair with multiple devices.

The second device 104 may include at least one of an input device 164 such as a keyboard, a mouse, a digital pen, a voice input device, a touch input device, etc. The second device 104 may further include an output device 166 such as a display, a speaker, a vibration device, a printer, etc.

Turning to the contents of the memory 132 of the second device 104 in more detail, the memory 132 may include an operating system 168 and one or more application programs or services for implementing the features disclosed herein including, without limitation, the second device contact library 134, the second device photo library 136, the second device music library 138, the second device video library 140, and the second file sharing application 142. While the second file sharing application 142 is illustrated in FIG. 1C as part of the memory 132, as noted above, the second file sharing application 142 may be part of the operating system 168.

While described in greater detail below, the file sharing application 142 may, in certain embodiments, retrieve and render the device icon 144 once the first device 102 is connected to the second device 104. As noted above, the device icon 145 may be received from the first device 102 or retrieved from local memory or remotely from a third party, such as a repository of device icons. Further, the file sharing application 142 may determine the file sharing functions, if any, associated with the device icon 145, such as a music transfer, a photo transfer, a contact transfer, etc. The file sharing application 142 also may enable the sharing function both in a transmit mode as well as in a receive mode. Yet further, the file sharing application 142 may manage the communication links (i.e., connections) between the second device 104 and any other device with which file sharing is desired, such as the first device 102. The file sharing application 142 may provide many other functions, some of which are discussed herein.

Figure 2:
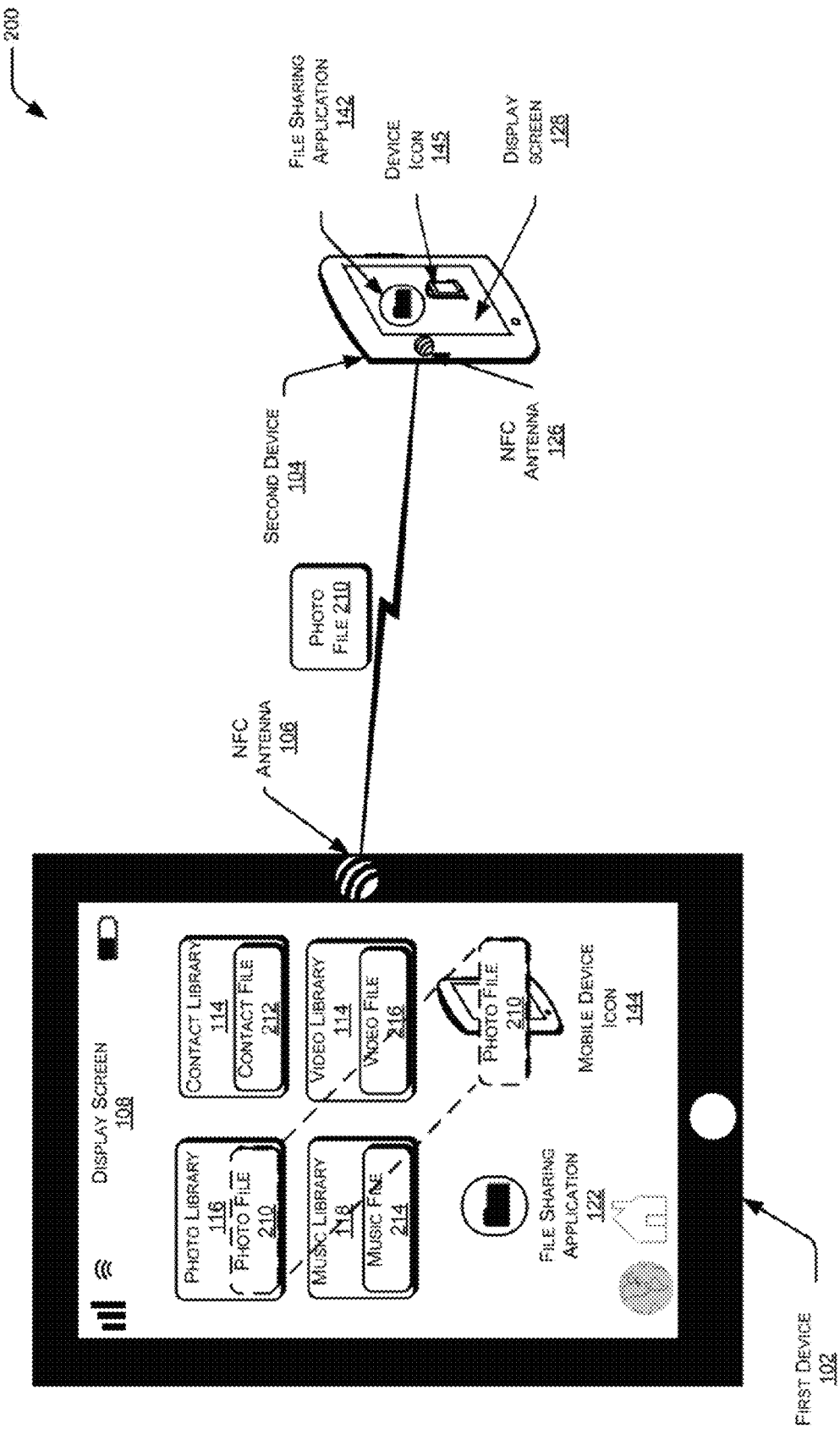
FIG. 2 illustrates an example data exchange, according to the illustrative embodiment of FIG. 1.

FIG. 2 illustrates an exemplary data exchange session 200 between the first device 102 and the second device 104. In one non-limiting implementation, to initiate the data exchange session, the first file sharing application 122 and the second file sharing application 142 may be activated. In some instances, activation of the first file sharing application 122 and the second file sharing application 142 may be by one or more user(s) of the respective devices. Alternatively and/or additionally, the first file sharing application 122 and the second file sharing application 142 may be activated upon the touch or tapping of the first device 102 to the second device 104, or by placing the NFC antenna 106 of the first device 102 and the NFC antenna 126 of the second device 104 in close proximity to one another. In accordance with an aspect of the disclosure, a touch or a tap of the first device 102 to the second device 104 may also establish the initial NFC communication link. The initial NFC communication link may enable a subsequent, and possibly more capable, communication link to be established between the first device 102 and the second device 104. For example, the NFC communication link, which is relatively quick to set up (i.e. pair) and uses relatively little power, may be utilized to bootstrap a communication link between the devices that is faster and therefore, more capable of transferring large amounts of data faster than an NFC communication link. Thus, the NFC communication link can be utilized, for example, to exchange device addresses (e.g., the MAC address), device name, and other pairing information (e.g., a pairing hash). The subsequent communication link may be a Wi-Fi, Wi-Fi Direct, Bluetooth®, Bluetooth low energy, or the like.

With continued reference to FIG. 2, as a part of establishing the communication links between the first device 102 and the second device 104, one or more data files including or facilitating the retrieval of the device icon 144 and the device icon 145 may be exchanged between the devices. In one non-limiting example, when the data file includes device identification information, the device icon 144 or the device icon 145 may be subsequently retrieved from the memory of the first device 102 or the second device 104, respectively. Alternatively, the device identification information associated with the device icon 144 or the device icon 145 may be provided to a third-party source for retrieval of the corresponding device icon. The device icon 144 and/or the device icon 145 may be displayed on the respective device display screens 108, 128. In certain embodiments, the device icon may be presented at a predetermined location or area of the display screen of the rendering device, such as at or about the location of the device's NFC antenna, and in certain embodiments, at or about the location of the NFC antenna utilized to establish the connection. For example, the device icon 144 may be rendered on the display screen 103 of the first device 102 at or about NFC antenna 106. Similarly, the device icon 145 may be rendered on the display screen 128 at or about the NFC antenna 126.

In one non-limiting example, the device icon 144 may represent the make and/or model of the second device 104 presented on the display screen 108 of the first device 102. For example, as illustrated in FIG. 2, the device icon 144 may appear as a certain make or model of a smart phone. Alternatively, the device icon 144 may appear as a device type, such as a tablet, a smart phone, a laptop, a wireless gaming device, etc. Yet further, the device icon 144 may have a generic appearance and may include a computing device, a logo, or other graphical indicia or design, as may be customized by a user to represent the user's device, or any combination thereof.

The device icon 144 may permit the user 124 to easily share data between the first device 102 and the second device 104. For example, the user 124 may select a file from the first device 102. The selection may be made by, without limitation, one or more touches of a finger, a stylus, a mouse click, one or more gestures, or the like. In some instances, the data shared with the second device 104 may include, without limitation, one or more photo files, one or more video files, one or more contacts, one or more calendar events, one or more music files, user preferences, or any other suitable content, and/or any combination thereof. For example, the photo library 116 may include a photo file 210, the contact library 114 may include a contact file 212, the music library 118 may include a music file 214 and the video library 120 may include a video file 216. In accordance with an aspect of the disclosure, the user 124 of the first device 102 may share a selected file with the second device 104 by utilizing a drag and drop technique. For example, the user 124 may want to share the photo file 210 from the photo library 116 of the first device 102. The user 124 may select the photo file 210 using any of the methods described above, and move the photo file 210 to the device icon 144 by dragging the photo file 210 across the display screen 108 of the first device 102. The user 124 may then drop the photo file 210 on the device icon 144, thereby initiating the transfer and/or sharing of the photo file 210 with the second device 104, by operation of the file sharing application 122. In one non-limiting example, the photo file 210 may be dropped on the device icon 144 when the photo file 210 floats on top of the device icon 144. In another non-limiting example, the user 124 need only drag the photo file 210 in the direction of the device icon 144, in what may be referred to as a flicking motion, for the photo file 210 to be transferred to and/or shared with the second device 104.

With continued reference to FIG. 2, the first file sharing application 122 may format the file, content, etc. to be transferred and/or shared between the first device 102 and the second device 104, and then facilitate the communication of the file, content, etc., to the second device 104. In some instances, the transfer of the file, content, etc. may be via the subsequent communication link, for example, via Bluetooth connection, Wi-Fi connection, Wi-Fi Direct connection, or the like. If more than one subsequent communication link exists between the first device 102 and the second device 104, then the file sharing application 122 may decide which communication link to utilize based on, for example, the amount of data to be sent, the speed of the respective communication links, the power consumption of the respective communication links, the cost associated with the utilization of the respective communication links (e.g., certain communication links may be associated with a pay-as-you-use data plan), etc.

The first file sharing application 122 may also determine what, if any, transfer function may be associated with the device icon 144, and then apply that function. For example, the device icon 144 may be associated with a photo share transfer function, and may include certain commands or data with the transferred file to facilitate certain action upon receipt at the receiving device. Other transfer functions may be directed to the transfer of different types of data or content, as well as other functions, such as an automated backup (e.g., a photo library, music library, contact list, calendar events, user preferences, etc, or combinations thereof and/or portions thereof, may be automatically backed up to the pairing device as a function of their connection). In a non-limiting example, the transfer function may be set by the user or in accordance with user preferences when the connection is established and/or afterwards while the connection is maintained.

At the receiving device (etc., the second device 104), the file sharing application 142 may determine which device icon 145 is associated with the received photo file 210. The second file sharing application 142 may also determine what to do with the received photo file 210, that is, what transfer function, if any, is associated with the device icon 145 (e.g., photo share, music share, etc.). For example, in some instances, following the receipt of the photo file 210 by the second device 104, the photo file 210; may be processed and/or stored on the second device 104 in a predetermined location on the second device 104, as may be predetermined by the second file sharing application 142. The applied processing and/or storage may, at least in part, be based on the transfer function associated with the device icon 145 (that is, with the connection established between the first device 102 and the second device 104). With regard to the storage example, a folder may be created on the second device 104 specifically for storing data transferred or shared from the first device 102. In another non-limiting example, the second device 104 may recognize a file extension associated with the photo file 210 and automatically store the photo file 210 in the second device photo library 136. For example, the photo file 210 may have a file extension .jpeg, which the second device 104 may recognize as a type of photo file and then store that file in the photo library 136 on the second device 104. Alternatively, the second file sharing application 142 may have an associated default location for storing any data files transferred and/or shared from the first device 102 and/or any other device.

With continued reference to FIG. 2, the data exchange session 200 may be terminated when the connection between the first device 102 and the second device 104 is lost or terminated. For example, if the subsequent communication link is lost, the data exchange session 200 may be terminated. That is, if the first device 102 and the second device 104 are not able to stay within a certain range of one another so as to maintain a minimum signal strength, the subsequent communication link may be lost and the session ended. Alternatively and/or additionally, either the first device 102 or second device 104 may terminate the data exchange session 200. For example, without limitation, a termination icon (e.g., an X) may be located near, adjacent to, or integrated within the device icon 144, the selection or integration of which indicates that the user 124 wishes to end the data exchange session 200. By way of another example, the user 124 may move or drag the device icon 144 outside of the display screen 108 of the first device 102, indicating that the user 124 wishes to terminate the data exchange session 200. This action would delete the device icon 144. Alternatively and/or additionally, the second device 104 may terminate the data exchange session 200 in any of the aforementioned manners. While FIG. 2 describes a photo file 210 being transferred and/or shared from the first device 102 to the second device 104, it is to be understood that a data exchange session 200 may be initiated whereby a photo file may be transferred and/or shared from the second device 104 to the first device 102. Further, the data or content shared and/or transferred may be of any type disclosed herein or that may reasonably be expected to be transferred wirelessly between two devices.

Figure 3:
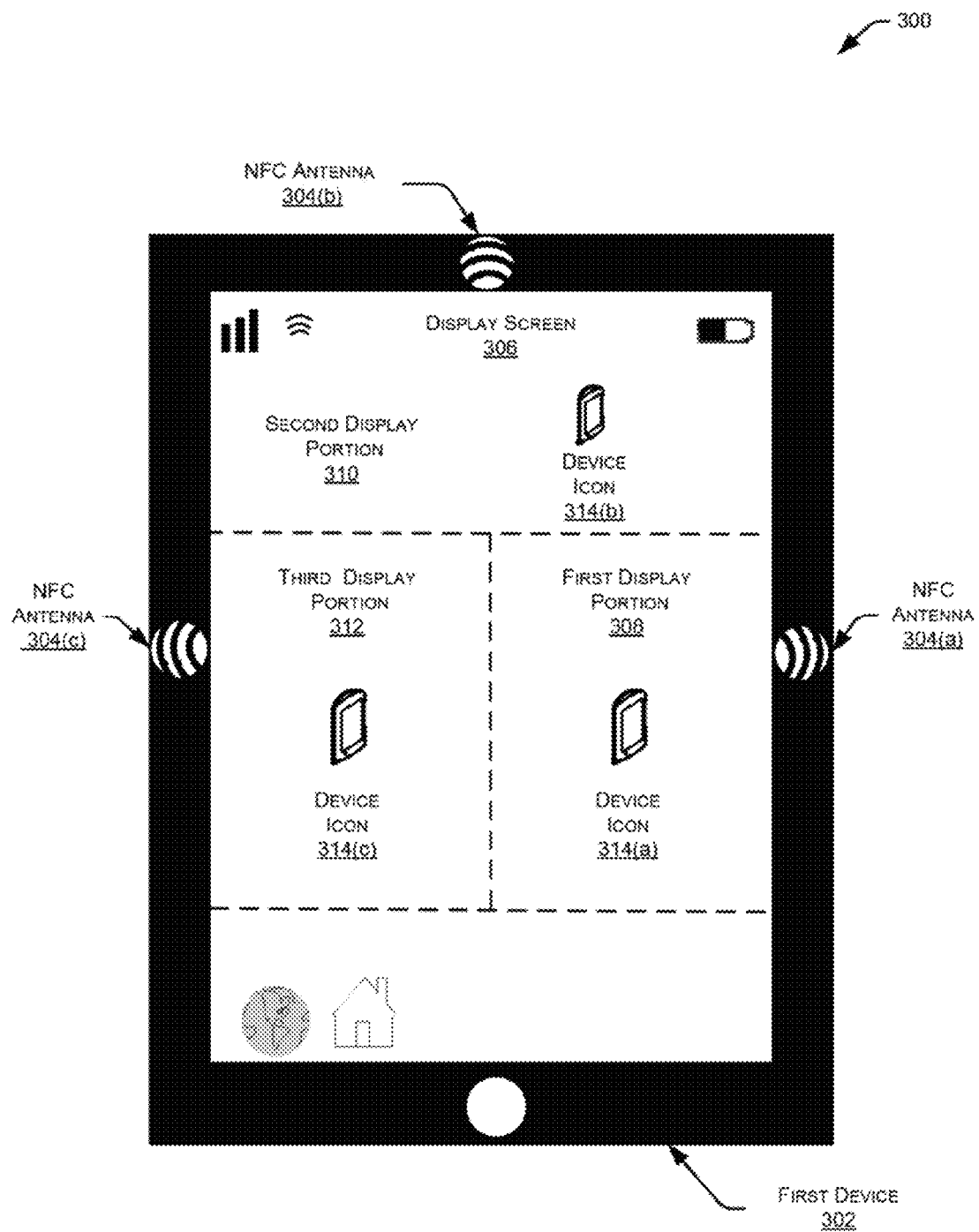
FIG. 3 illustrates an example environment that may be utilized to connect, select, and/or transfer data files among NFC enabled devices utilizing multiple antennas, according to an illustrative embodiment of the disclosure.

FIG. 3 depicts an illustrative environment 300 in which additional techniques for connecting near field communication (NFC) enabled mobile devices and sharing data files between the NFC enabled mobile devices may be implemented. In environment 300, the first device 302 may include two or more NFC antennas. In one non-limiting example, the first device 302 may include two or more NFC antennas 304(a)-304(c) similar to the NFC antenna 106 described above with respect to FIGS. 1A-1C and 2. For example, as illustrated in FIG. 3, the first device 302 may include an NFC antenna 304(a), an NFC antenna 304(b), and an NFC antenna 304(c). These NFC antennas 304(a)-304(c) enable one or more other NFC enabled devices to touch or tap the first device 302 in one or more of these locations to initiate the establishment of a connection. For example, if the initial NFC communication link with a second device (not shown) is established via NFC antenna 304(a) by touching or tapping the first device 302 and the second device at NFC antenna 304(a) such that an NFC connection is established via antenna 304(a), the first device 302 may recognize that the second device is located on the right side of the first device 302.

In some instances, each NFC antenna may be associated with a respective display portion of a display screen 306 of the first device 302. In one non-limiting example, the NFC antenna 304(a) may be associated with a first display portion 308, the NFC antenna 304(b) may be associated with a second display portion 310, and the NFC antenna 304(c) may be associated with a third display portion 312, such that if a second device touches or taps the first device 302 at or about the NFC antenna 304(a), the first device 302 may recognize the location of the tap and, upon establishing a connection with the second device, may display a corresponding device icon 314(a) representative of the second device within the first display portion 308. The corresponding device icon 314(a) may be similar to the device icon 144 described above with respect to FIGS. 1 and 2. Similarly, connections with one or more NFC enabled devices may be established via NFC antenna, 304(b) and 304(c), and corresponding device icons 314(b) and 314(c) may be displayed in corresponding second display portion 310 and third display portion 312, respectively.

With continued reference to FIG. 3, one or more of the NFC antennas 304(a)-304(c) may be associated with one or more corresponding transfer functions. For example, a touch (or tap) of a second device at or about the NFC antenna 304(a) may facilitate the sharing and/or transferring of a photo file. In another example, a touch (or tap) of a second device at or about the NFC antenna 304(b) may facilitate the sharing and/or transferring of a contact file. In yet another example, a touch (or tap) of a second device at or about the NFC antenna 304(c) may facilitate the backing up of certain files or libraries from the first device 302 to the second device. In some instances, the associated transfer and/or sharing functions may be predetermined by the user 12. Alternatively and/or additionally, the first file sharing application of the device 302 may have one or more default settings, as described in FIGS. 1 and 2, associated with each of the NFC antennas 304(a)-304(c).

In some instances, the same second device may touch (or tap) multiple NFC antenna locations of the first device 302 such that each tap is at or about a different NFC antenna, resulting in multiple concurrent wireless connections between the two devices. For example, a first tap may be at or about the NFC antenna 304(a) immediately followed by a second tap at or about the NFC antenna 304(b). In some instances, each tap may result in the simultaneous display of a device icon representing the second device in the associated first display portion 308 and the second display portion 310, respectively.

Figure 4:
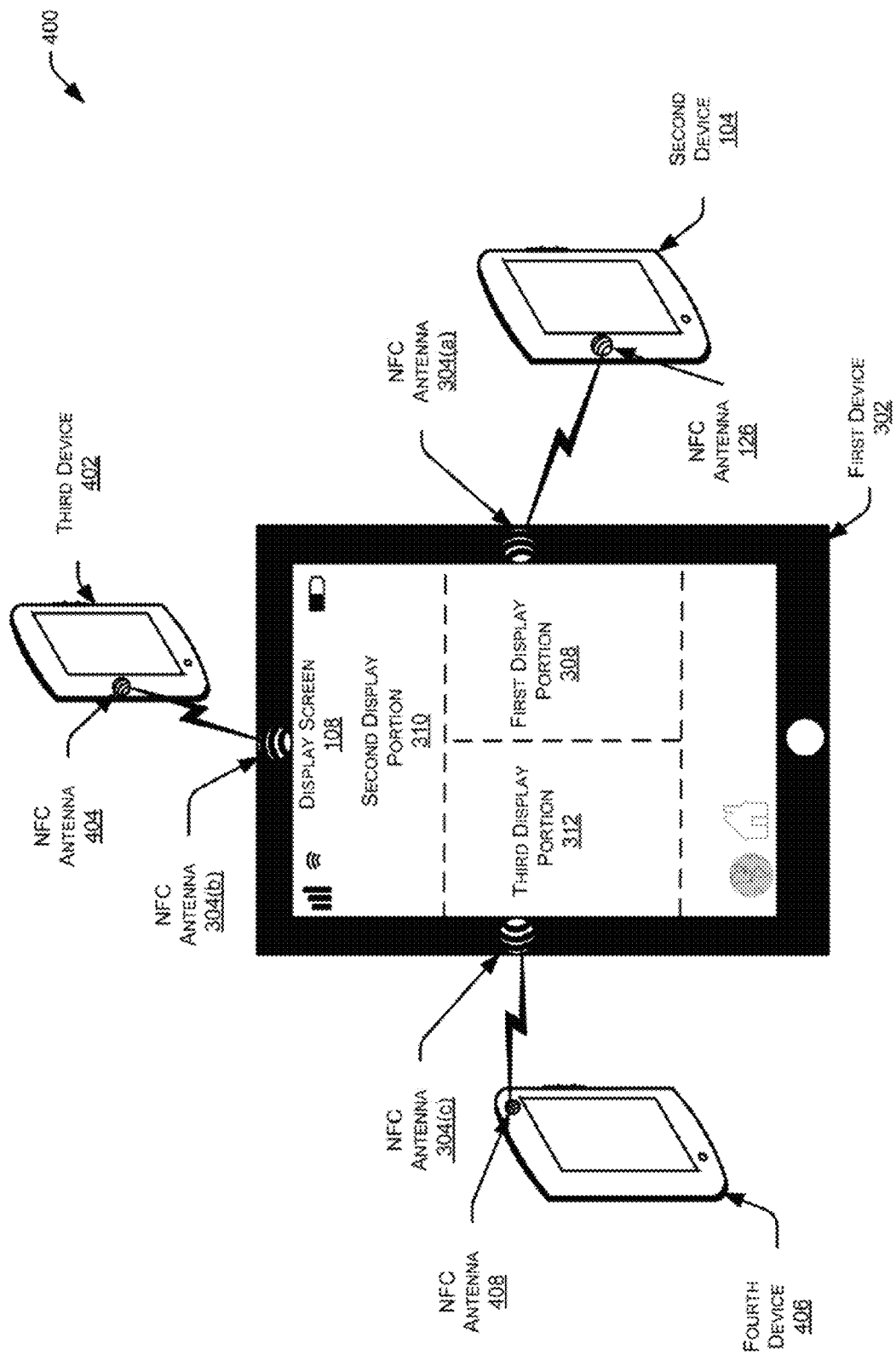
FIG. 4 illustrates another example environment that may be utilized to connect, select, and/or transfer data files among NFC enabled devices utilizing multiple antennas and multiple mobile user devices, according to an illustrative embodiment of the disclosure.

FIG. 4 depicts an illustrative environment 400 in which additional techniques for connecting near field communication (NFC) enabled mobile devices and sharing data files between the NFC enabled mobile devices may be implemented. In some instances, each of the NFC antenna 304(a), the NFC antenna 304(b), and NFC antenna 304(c) may enable the first device 302 to connect to more than one NFC enabled device, e.g., the second device 104, and a third device 402. In one non-limiting example, the second device 104 may communicate with the first device 302 via a communication link established between the NFC antenna 304(a) on the first device 302 and the NFC antenna 126 of the second device 104. Additionally, the third device 402 may communicate with the first device 302 via the communication link established over the NFC antenna 304(b) and an NFC antenna 404 of another NFC enabled device such as third device 402. Yet a fourth device 406 may communicate with the first device 302 via a communication link over the NFC antenna 304(c) and an NFC antenna 408 on the fourth device 406. The communication established between the respective devices may be simultaneous, or alternatively the communication may be subsequent to one another. In certain embodiments, by placing the device icons associated with the connections to the second, third and fourth devices 104, 402, and 406 within their corresponding display portions 308, 310, and 312, the first device 302 may present the relative location of the second, third and fourth devices relative to the first device. This may facilitate more intuitive sharing of content because the user of the first device may be able to drag-and-drop or flick data files (e.g., content) at a device icon on the display screen of the first device 302, which may generally be in the same direction as the location of the device (and therefore user) with which the user of the first device wishes to share/transfer the data files.

Figure 5A:
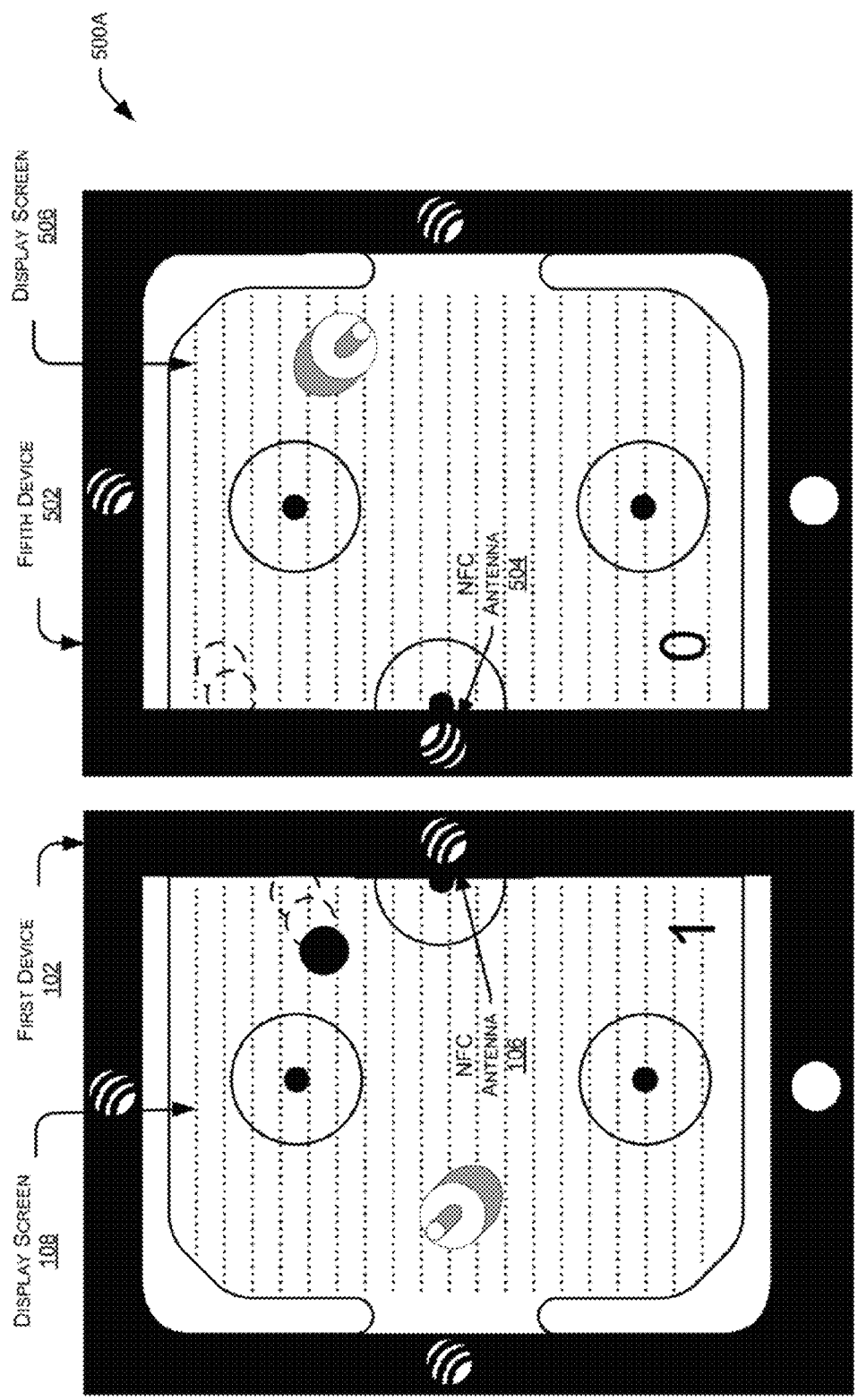
FIGS. 5A and 5B illustrate other example environments where two NFC enabled devices may utilize the location awareness of the NFC connection between the devices to present coordinated screen views, according to an illustrative embodiment of the disclosure.
Figure 5B:
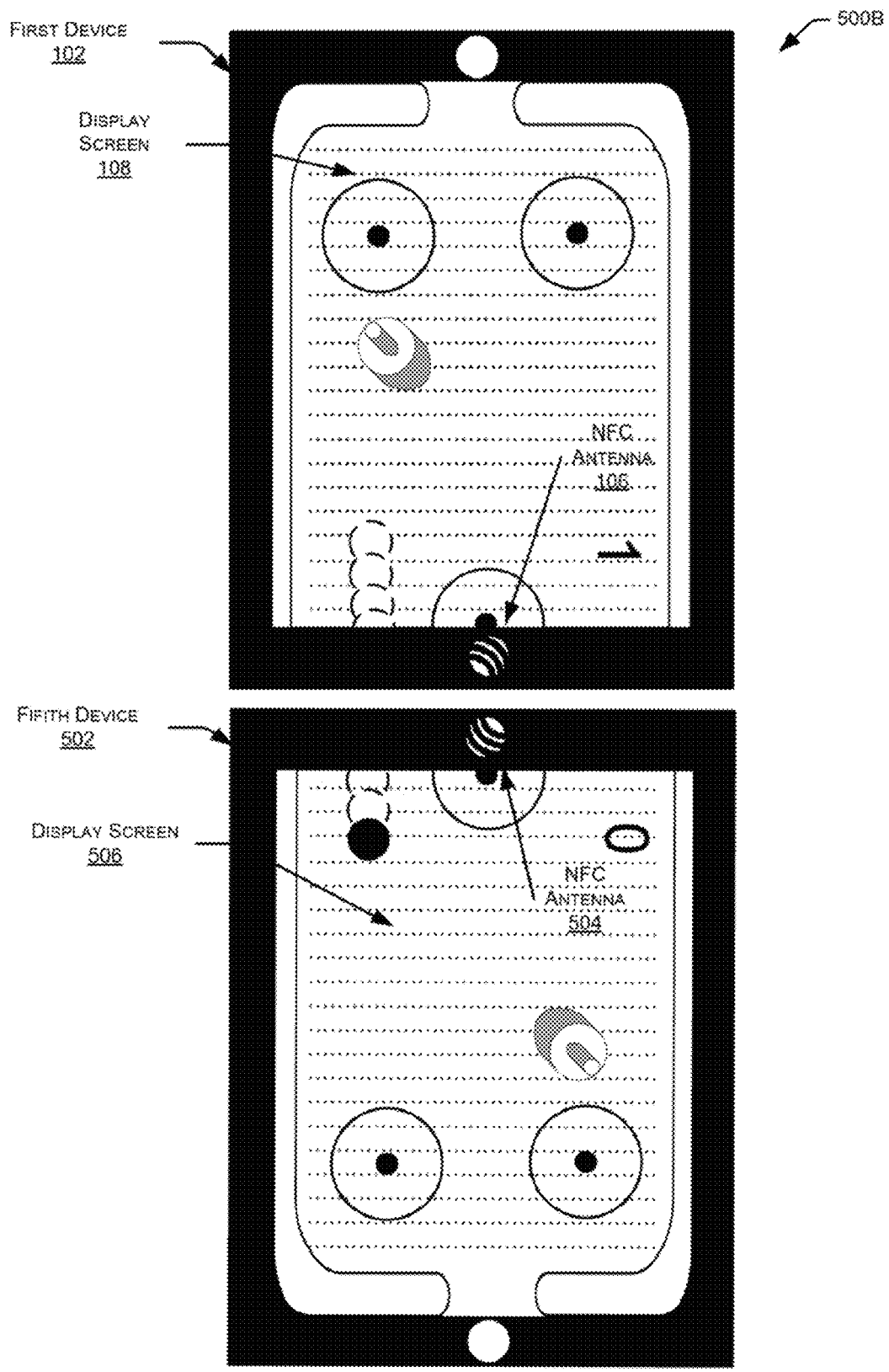

FIGS. 5A and 5B depict illustrative environments 500A and 500B in which additional techniques for connecting NFC enabled device is disclosed, wherein the devices may utilize the location awareness of the NFC connection between the devices to present coordinated screen views. For example, two NFC enabled devices may establish a wireless connection in accordance with the present disclosure, and then the two devices may create a screen extension of one another that automatically takes into account the physical posture of the devices, without the need for the users to manually configure the screen orientations. For instance, by knowing the location of the NFC antennas that are utilized to establish a wireless connection between two devices, the devices may be positioned next to one another with their respective NFC antennas next to one another, and then one device may create a screen extension of the other device with the orientation of the display screen automatically aligned based on the device awareness of the location of the pairing NFC antennas.

With reference to FIG. 5A, the fifth device 502 may include one or more NFC antennas. In one non-limiting example, the first device 102 may include one or more NFC antennas 106 described above with respect to FIGS. 1A-1C, 2, 3, and/or 4. For example, as illustrated in FIGS. 5A and 5B, the first device 102 may include an NFC antenna 106. The NFC antenna 106 enables one or more other NFC enabled devices to touch or tap the first device 102 to initiate the establishment of a connection.

With reference to FIG. 5A, if the initial NFC communication link with a fifth device 502 is established via NFC antenna 106 by touching or tapping the first device 102 and the fifth device 502 at NFC antenna 106 such that an NFC connection may be established via NFC antenna 106, the first device 102 may recognize that the fifth device 502 is located on the right side of the first device 102 (e.g., positioned horizontally). With reference to FIG. 5B, if the initial NFC communication link with a fifth device 502 is established via an NFC antenna 106 such that an NFC connection may be established via the NFC antenna 106, the first device 102 may recognize that the first fifth device 502 is positioned vertically.

With reference to FIGS. 5A and/or 5B, a touch (or tap) of a fifth device 502 at or about the NFC antenna 106 may facilitate the fifth device 502 to function as an automatic screen extension or secondary display screen for the first device 102 in a the corresponding direction of the fifth 502 device without requiring user configuration. In one non-limiting example, the fifth device 502 may communicate with the first device 102 via a communication link established between the NFC antenna 106 on the first device 102 and the NFC antenna 504 of the fifth device 502. In certain embodiments, the first device 102 may present the location of the fifth device 502 relative to the first device 102. This may facilitate display screen 506 to function as an extension of display screen 108, in the corresponding direction of the fifth device 502. Alternatively and/or additionally, the extension of display screen 108 on the first device 102 to display screen 506 on the filth device 502 may enable interactive gaming between the devices. For example, a game may include a set of graphics that would move from the first device 102 to the fifth device 502 in the corresponding direction of the fifth device 502, enabling a game's user interface to span across display screen 108 of the first device 102 and display screen 506 of the fifth device 502. In one non-limiting example, the first device 102 and the fifth device 502 may run a common application (e.g., a game application) in a peer-to-peer configuration. Alternatively, the first device 102 and the fifth device 502 may run the common application in a client-server architecture via the subsequent communication link.

Illustrative Processes

Figure 6:
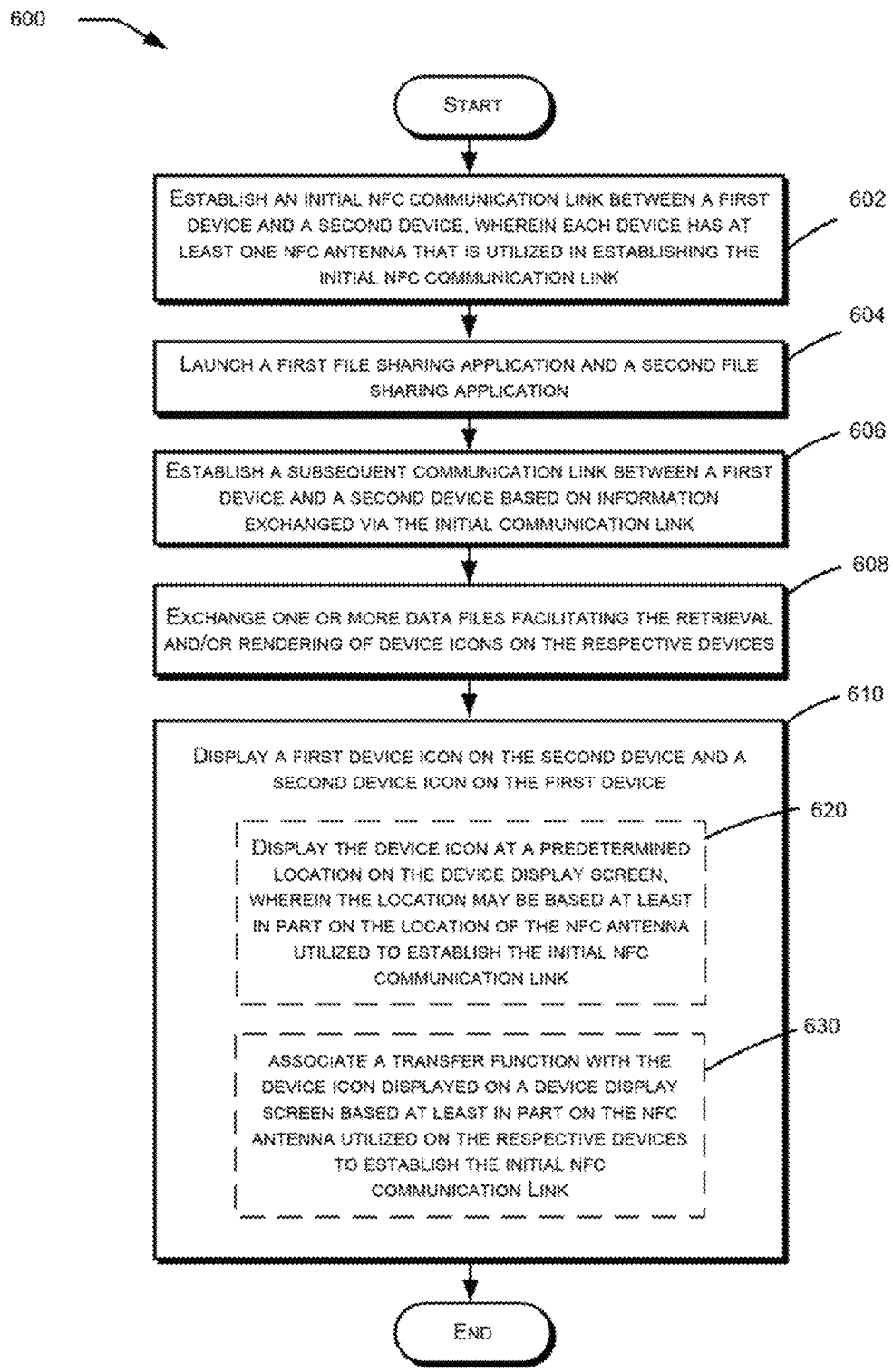
FIG. 6 illustrates a flow diagram of one example process for connecting NFC enabled devices, according to an illustrative embodiment of the disclosure.

FIG. 6 illustrates a flow diagram of an example process 600 for connecting and selecting one or more data files for transferrin/sharing between NFC enabled devices. The process 600 may begin at block 602, where an initial communication link, such as an NFC connection, may be established between a first device and a second device. In one non-limiting example, the communication link may be established when the first device and the second device touch or are tapped together proximate to the location of each device's NFC antenna. Alternatively and/or additionally, the initial communication link may be established when an NFC antenna on the first device is within a proximity of an NFC antenna on the second device, such as, for example, a distance of four centimeters or less.

At block 604, a file sharing application on the first device and a file sharing application on the second device may be activated. For example, a first file sharing application may be launched on a first device, and a second file sharing application may be launched on a second device. In one non-limiting example, the file sharing applications may be activated upon the touch or tap of two NFC enabled devices. Alternatively, users of the respective devices may launch the file sharing applications on their respective devices.

At block 606, a subsequent communication link may be established between the first device and the second device. In one non-limiting example, the subsequent communication link, which may be a peer-to-peer connection such as a Bluetooth or Wi-Fi Direct connection, may be established through a data exchange over the initial communication link. The data exchange may include device identifications, device addresses, and/or security tokens, as may be required, to establish the pairing for the subsequent communication link, which may have a longer range and a faster data rate as compared to an NFC connection, and therefore, may be preferable for the sharing or transfer of relatively large data files.

At block 608, one or more data files containing or facilitating the retrieval and/or rendering of device icons may be exchanged between the first device and the second device. In one example, the data files associated with the device icons may be exchanged concurrently with the establishment of the initial communication link. Alternatively, the data files associated with the device icons may be exchanged following the establishment of the subsequent communication link. The data files may include the device icon and/or device icon identification data that may be utilized to retrieve from the memory of the receiving device the device icon that represents the other device. Alternatively, the device icon identification data may be provided to a third-party source for retrieval of the device icon, such as a central depository accessible over the Internet.

At block 610, the device icon representing the other device may be displayed on each device's display screen. In certain embodiments, as indicated at optional block 620, the device icon may be rendered on the display screen of a device in a predetermined location or area of the device's display screen. The location may be based at least it part on the location of the NFC antenna on a device; that is, the device icon may be positioned proximate or near the NFC antenna utilized to establish the initial communication link. In some embodiments, the device icon may be positioned over other icons on the display screen. In yet other embodiments, the icons on display screen may be rearranged to allow the device icon to be positioned proximate or near the NFC antenna, such as adjacent to the edge of the display screen next to the edge nearest the NFC antenna. The device icon may be a representation of the paired or connected devices, such as the make and/or model of the connected devices, or it may be representative of a generic device and/or it may comprise a logo or other graphical indicia or design, as may be customized by a user to represent the user's device.

At optional block 630, a transfer function may be associated with the device icon displayed on the device display screen. The transfer function may be based at least in part on the NFC antenna utilized to establish the initial communication link. For example, the device icon may be associated with a transfer configuration for the transfer/share and/or receipt of music, photos, videos, contacts, calendar events, user preferences, or any other suitable content.

Figure 7:
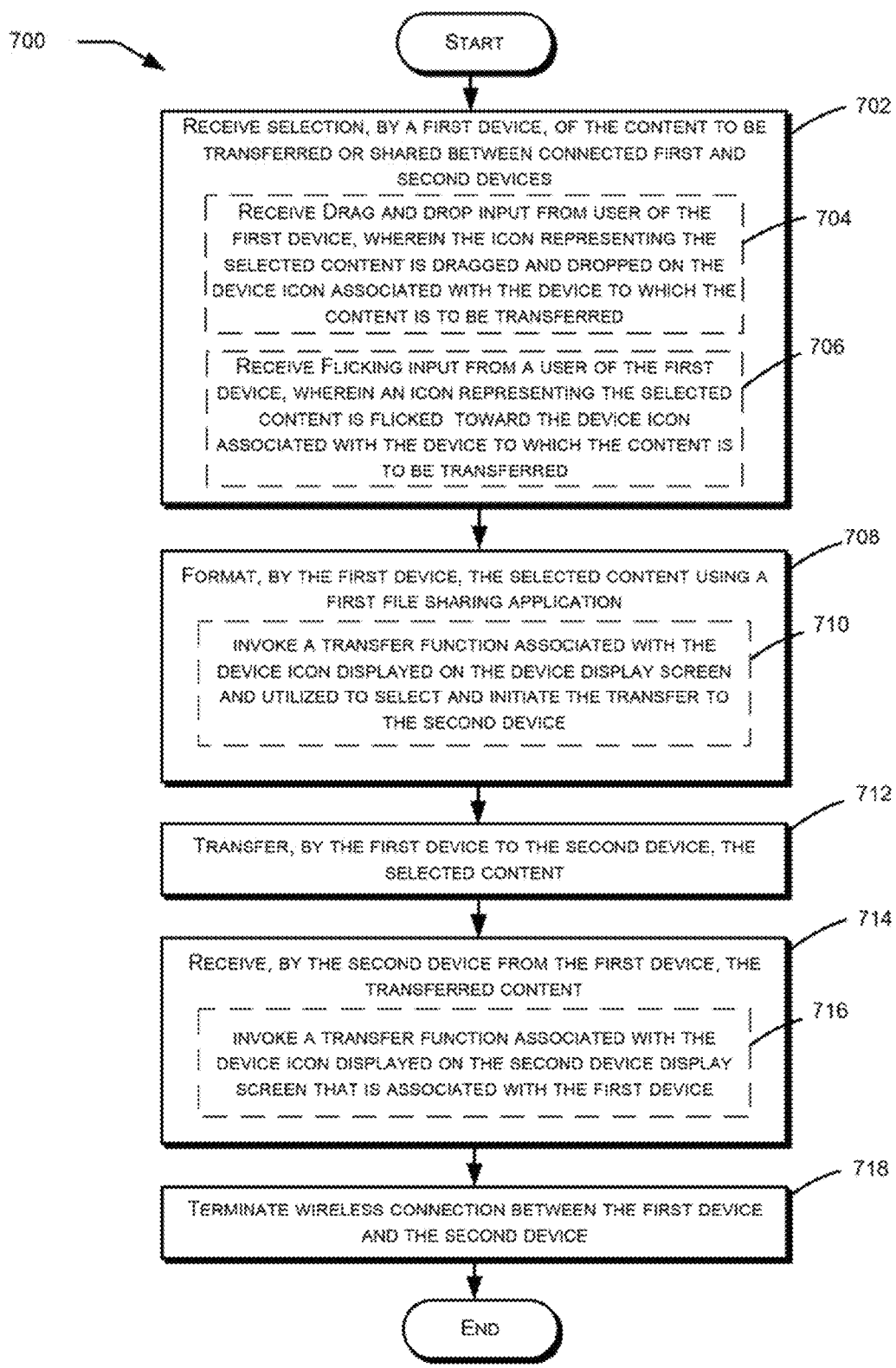
FIG. 7 illustrates a flow diagram of one example process for selecting and transferring data files among NFC enabled devices, according to an illustrative embodiment of the disclosure.

FIG. 7 illustrates a flow diagram of an example process 700 for selecting, sharing transferring and/or receiving one or more data files (e.g., content) between more than one NFC enabled device. The process 700 may begin at block 702, where a data file may be selected, by a first device, for transferring and/or sharing with the paired or connected device. In some instances, as indicated by optional block 704, the file may be selected by a user using, for example, a touch of the user's finger or a stylus, or any other suitable user input device to drag and drop the icon representing the selected data file (e.g., content) onto the device icon. Alternatively, as indicated by optional block 706, again with a touch of the user's finger or a stylus, or any other suitable user input device, a user of the first device may utilize a flicking motion where an icon representing the selected data file (e.g., content) is quickly dragged toward the device icon and released, essentially flicking the data icon at the device icon. Such a motion can be detected by the first device and may result in the selection of the data file (e.g., content) for sharing or transferring to the paired or connected second device.

At block 708, a file sharing application of the first device may format the data file, that is, the content, for transmission to the second device over the subsequent communication link, such as a Bluetooth or W-Fi connection. As indicated by optional block 710, a transfer function associated with the device icon may be invoked. For example, if the device icon is associated with a music sharing function, then the file sharing application may operate in accordance with the transfer function to facilitate the transmission of the music file to the second device and, in doing so, will format the data file so that it will be recognized by the second device.

At block 712, the selected and formatted content may be wirelessly transmitted to the second device over the subsequent communication link. At block 714, the content is received by the second device. The second device will recognize that the content is from the first device, will recognize any, transfer function is associated with the transfer of the data file to the second device, and will invoke any such transfer function as indicated by optional block 716. For example, upon receipt of the file, content, etc., by the second device, the second file sharing application may process the received, data (e.g., determine the type of data) and store it accordingly.

At block 718, the connection between the first device and the second device may be terminated. In one example, the connection may be terminated when the communication link between the first device and the second device is lost because, for example, the signal strength is too low. Alternatively, termination of the wireless connection may result from an action performed on the first device or an action performed on the second device, as described above.

Figure 8:
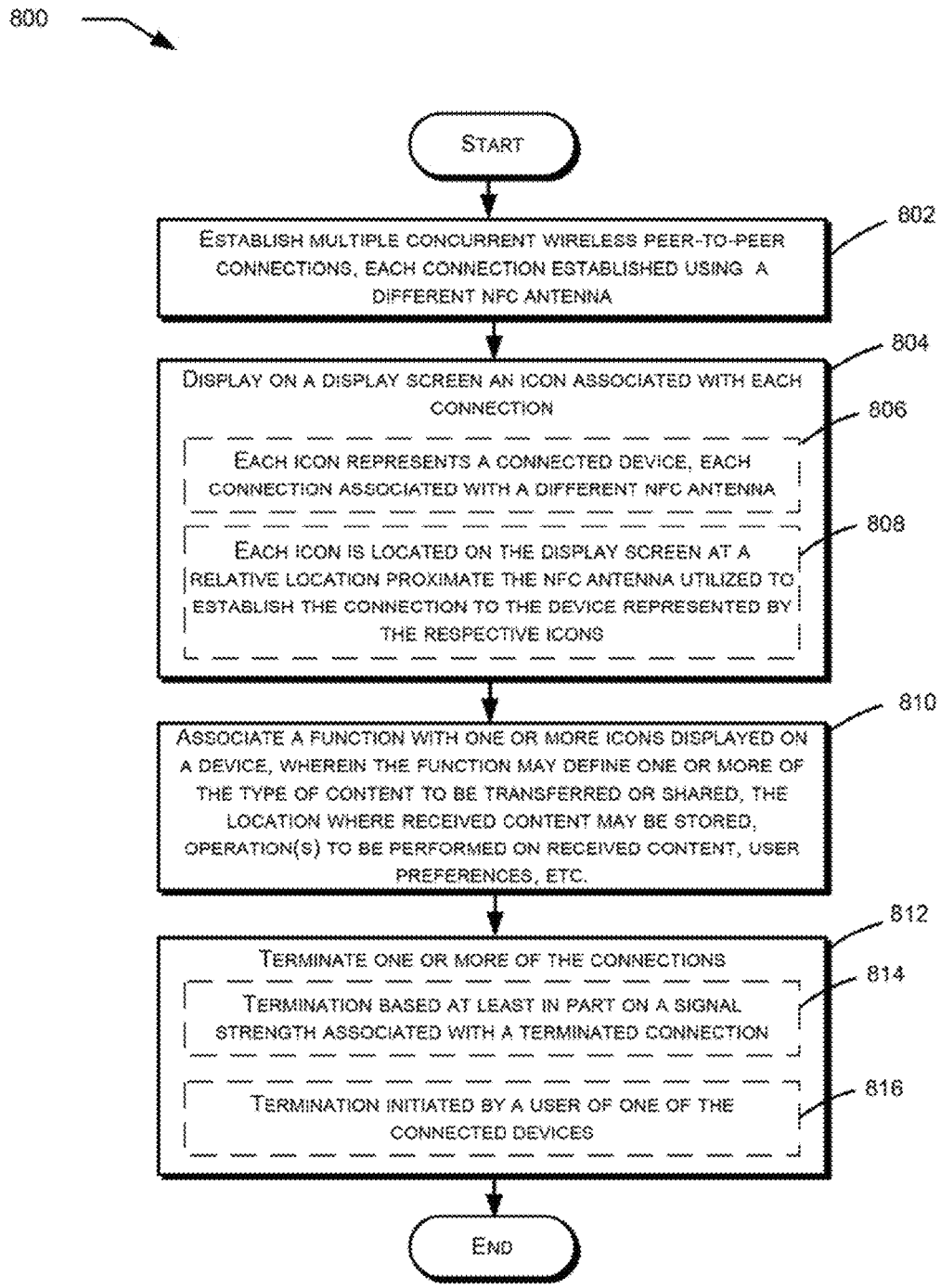
FIG. 8 illustrates a flow diagram of one example process for using multiple antennas for connecting, selecting, and/or transferring data files among NFC enabled devices, according to an illustrative embodiment of the disclosure.

FIG. 8 illustrates a flow diagram of an example process 800 for connecting, selecting and/or sharing one or more data files between more than one NFC enabled devices. The process 800 may begin at block 802, where a device establishes multiple concurrent peer-to-peer connections, each connection being associated with a different NFC antenna of the device. Each of the different connections may be with a different device, and/or more than one connection may be made with a single device, although each connection may be associated with a different NFC antenna.

At block 804, an icon associated with each connection may be displayed. At optional block 806, each icon may represent a connected device, wherein each connection is associated with a different NFC antenna. For example, the device may include three NFC antennas located about three different edges of the device. Each of the concurrent connections may be established by touching or tapping the device with another NFC enabled device at the respective NFC antennas. Further, in accordance with the disclosure, each connection may be represented on the display screen of the device by a device icon located relatively near the edge of the display screen where the NFC antenna that facilitated its connection via an initial communication link is located, as indicated by optional block 808.

At block 810 a file sharing application of the device may associate a function with one or more of the icons displayed on a device, wherein the function may define one or more of the type of content to be shared or transferred, the location where the received content may be stored, operations to be performed in connection with transmitting or receiving the content, user preferences, etc.

At block 812, the connection between the first device and the second device may be terminated. In one example, the connection may be terminated when the communication link between the first device and the second device is lost because, for example, the signal strength is too low. Alternatively, termination of the wireless connection may result from an action performed on the first device or an action performed on the second device, as described above.

The operations described and shown in the processes 600, 700 and 800 of FIGS. 6, 7 and 8 may be carried out or performed in any suitable order as desired in various embodiments of the invention. Additionally, in certain embodiments, at least a portion of the operations may be carried out in parallel. Furthermore, in certain embodiments, fewer than or more than the operations described in FIGS. 5, 6 and 7 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   establishing, by a first wireless device comprising at least one processor and a first NFC antenna, a first initial communication link with a second wireless device using the first NFC antenna;
   establishing, by the first wireless device with the second wireless device, a first subsequent communication link based at least in part on first data communicated over the first initial communication link;
   receiving, by the first wireless device, a data file associated with a device icon representing the second wireless device;
   displaying, by the first wireless device, the device icon, wherein the device icon is configured to facilitate the transfer of one or more selected files to the second wireless device utilizing the first subsequent communication link;
   establishing, by the first wireless device using a second NFC antenna, a second initial communication link with the second wireless device or a third wireless device; and
   establishing, by the first wireless device, a second subsequent communication link based at least in part on second data communicated over the second initial communication link.

2. The method of claim 1, wherein the first initial communication link is a near field communication (NFC) connection.

3. The method of claim 1, wherein the data communicated over the first initial communication link comprises one or more device addresses or one or more security tokens.

4. The method of claim 1, wherein the data file associated with the device icon comprises device identification information associated with the second wireless device.

5. The method of claim 1, further comprising receiving, by the first wireless device, a selection of at least one of the one or more selected files, the selection including a drag-and-drop user input in connection with the device icon.

6. The method of claim 1, wherein establishing the first initial communication link comprises activation of a file sharing application on the first wireless device.

7. The method of claim 1, wherein the first subsequent communication link comprises a Bluetooth connection or a Wi-Fi Direct connection.

8. The method of claim 1, wherein the first wireless device includes at least two NFC antennas.

9. The method of claim 1, wherein the first initial communication link and the second initial communication link are established with the second wireless device and the third wireless device, respectively.

10. The method of claim 1, wherein the first subsequent communication link is associated with a first function, and the second subsequent communication link is associated with a second function.

11. The method of claim 10, wherein the first function is at least one of a backup function, an audio sharing function, a photo sharing function, a video sharing function, or a contact sharing function.

12. A system comprising:
    a memory operable to store computer-executable instructions;
    a plurality of near field communication (NFC) antennas;
    a display screen; and
    a processor configured to access the memory and to execute the computer-executable instructions to:
       establish a first wireless data transfer connection with a second device using a first NFC antenna of the plurality of NFC antennas;
       receive a data file associated with a device icon representing the second device;
       display the device icon on the display screen, wherein the device icon is configured to facilitate the transfer of data to the second device over the first wireless data transfer connection;
       initiate a transfer of the data, utilizing the device icon, to the second device over the first wireless data transfer connection; and
       establish a second wireless data transfer connection with the second device or a third device using a second NFC antenna of the plurality of NFC antennas.

13. The system of claim 12, wherein establishing the first wireless data transfer connection includes establishing an NFC connection with the second device for exchanging pairing data, and establishing the first wireless data transfer connection based at least in part on the exchanged pairing data.

14. The system of claim 12, wherein the second NFC antenna of the plurality of NFC antennas is utilized to establish the second wireless data transfer connection with the third device.

15. The system of claim 12, wherein the device icon comprises a first device icon and the data comprises first data, and wherein the processor is further configured to execute the computer-executable instructions to:
    display a second device icon on the display screen, wherein the second device icon is configured to facilitate the transfer of second data to the third device over the second wireless data transfer connection.

16. The system of claim 15, wherein the first device icon and the second device icon are positioned on the display screen at locations based at least in part on the location of the first NFC antenna and the second NFC antenna, respectively.

17. The system of claim 12, wherein the one or more data files comprise at least one of a music file, a photo file, a video file, a contact file, or a calendar file.

18. One or more computer-readable media storing computer-executable instructions that, when executed on one or more processors, cause the one or more processors to perform operations comprising:
    establishing, by a first device, a first initial wireless communication link with a second device using a first NFC antenna;
    establishing, by the first device, a first subsequent wireless communication link based at least in part on first data communicated over the first initial wireless communication link;
    receiving, by the first device, a data file associated with a device icon representing the second device;
    displaying the device icon, wherein the device icon is configured to facilitate the transfer of one or more data files from the first device to the second device utilizing the first subsequent wireless communication link;
    establishing, by the first device using a second NFC antenna, a second initial wireless communication link with the second device or a third device; and
    establishing, by the first device, a second subsequent wireless communication link based at least in part on second data communicated over the second initial wireless communication link.

19. The one or more computer-readable media of claim 18, the one or more processors further to perform the operation comprising receiving a selection of one of the one or more data files, the selection including a detection of a drag-and-drop user input in connection with the device icon.

20. The one or more computer-readable media of claim 18, wherein establishing the first initial wireless communication link comprises activating a file sharing application on the first device.

\* \* \* \* \*